US011061563B1

(12) United States Patent
Nielsen et al.

(10) Patent No.: US 11,061,563 B1
(45) Date of Patent: Jul. 13, 2021

(54) INTERACTIVE CHARTS SYSTEM AND METHOD

(71) Applicant: Rockwell Collins, Inc., Cedar Rapids, IA (US)

(72) Inventors: Michael J. Nielsen, North Liberty, IA (US); Brian Rockwell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/734,726

(22) Filed: Jan. 6, 2020

(51) Int. Cl.
*G06F 3/0488* (2013.01)
*G06F 3/0484* (2013.01)
*G06F 3/14* (2006.01)
*B64D 43/00* (2006.01)

(52) U.S. Cl.
CPC ......... *G06F 3/04886* (2013.01); *B64D 43/00* (2013.01); *G06F 3/04847* (2013.01); *G06F 3/14* (2013.01)

(58) Field of Classification Search
CPC .... G06F 3/14; G06F 3/04886; G06F 3/04847; B64D 43/00
See application file for complete search history.

(56) References Cited

U.S. PATENT DOCUMENTS

| | | | |
|---|---|---|---|
| 5,978,715 A | 11/1999 | Brife et al. | |
| 7,475,054 B2 | 1/2009 | Hearing et al. | |
| 8,818,580 B2 | 8/2014 | Louise-Babando et al. | |
| 9,284,045 B1 * | 3/2016 | Springer | B64D 43/00 |
| 9,558,670 B1 * | 1/2017 | Sheth | G01C 21/005 |
| 9,703,476 B1 * | 7/2017 | Pappas | G06F 3/04886 |
| 9,719,799 B2 | 8/2017 | Pandit et al. | |
| 9,849,999 B1 * | 12/2017 | Fymat | B64D 43/00 |
| 10,347,140 B2 | 7/2019 | Kneuper et al. | |
| 2014/0018979 A1 * | 1/2014 | Goossen | G05D 1/0044 701/3 |
| 2014/0309821 A1 * | 10/2014 | Poux | B64D 45/00 701/14 |
| 2014/0343762 A1 * | 11/2014 | Buratto | B64D 43/00 701/14 |
| 2015/0261379 A1 * | 9/2015 | Kneuper | G01C 23/00 345/173 |
| 2015/0338237 A1 * | 11/2015 | Bonamy | G01C 23/005 340/973 |
| 2017/0221368 A1 * | 8/2017 | Zhang | G08G 5/0034 |
| 2017/0236438 A1 * | 8/2017 | Delisle | G09B 9/02 434/362 |
| 2019/0041233 A1 * | 2/2019 | Duerksen | G08G 5/02 |

FOREIGN PATENT DOCUMENTS

IN 1948CHE2013 A 6/2016

* cited by examiner

*Primary Examiner* — Nicholas Klicos
(74) *Attorney, Agent, or Firm* — Suiter Swantz pc llo (57) ABSTRACT

A system and method for activation of chart data via touchscreen enables a pilot to touch a system generated hotspot within the flight chart displayed on the touchscreen and thereby affecting a change in an aircraft system. The system overlays a hotspot over chart data within the flight chart and associates the hotspot and hotspot data with the chart data. Upon reception of a pilot command of selection of the hotspot, the system verifies the pilot command and interfaces with the aircraft systems to make the change in frequency, navigation, and path of the aircraft.

13 Claims, 6 Drawing Sheets

INTERACTIVE CHARTS SYSTEM AND METHOD

BACKGROUND

To communicate with a specific entity during a flight, currently a pilot must look up a frequency in flight chart or book, look down at an aircraft system (e.g., communications system), select the desired frequency in the aircraft system, and activate the frequency to enable communications with the desired entity. All this eye movement and time required removes the pilot from actively flying the aircraft or actively monitoring the pilot flying.

During high workload periods, this lengthy activity away from actively operating or monitoring the aircraft may lead to a deviation in flight path or a missed assignment or altitude. In some areas, frequency changes are frequent and may interrupt proven safety measures leading to loss of situational awareness.

Therefore, a need remains for a system and related method which may overcome these limitations and provide a novel solution to changing a frequency via an interactive touchscreen within an aircraft communications or navigation system.

SUMMARY

In one aspect, embodiments of the inventive concepts disclosed herein are directed to a system for activation of chart data via touchscreen. The system may comprise a touchscreen display within a flight deck of an aircraft, the touchscreen display configured for display of a flight chart. To enable pilot interaction with the flight chart, the system may associate a hotspot with a specific position within the touchscreen display, the hotspot collocated with a chart data displayed on the flight chart, the hotspot selectable by a pilot via the touchscreen display, the hotspot including a hotspot data which includes at least the chart data and the specific position.

The system may further include an interface between the touchscreen display and an aircraft system, the aircraft system including a communication system (Comm), a navigation system (Nav), and a flight management system (FMS). For control of the system a controller may operatively couple with the touchscreen display and a tangible, non-transitory memory may be configured to communicate with the controller, the tangible, non-transitory memory having instructions stored therein that, in response to execution by the controller, cause the controller to carry out a plurality of function of the system.

In function, the system may display the flight chart on the touchscreen display and overlay the hotspot over the chart data at the specific position within the flight chart. The system may receive a pilot command to activate the hotspot data via the hotspot, the pilot command a physical touch of the specific position or a pilot selection via a cursor-controlled interaction and display a verification on the touchscreen display. The system may receive a pilot selection of the verification and command the aircraft system via the interface to comply with the pilot selection of the verification.

A further embodiment of the inventive concepts disclosed herein may include a method for activation of chart data via touchscreen. The method may include displaying a flight chart on a touchscreen display within a flight deck of an aircraft, the touchscreen display configured at least for display of a flight chart, the flight chart including at least one instance of a chart data and overlaying a hotspot over the chart data at a specific position within the touchscreen display, the hotspot collocated and associated with the chart data displayed on the flight chart, the hotspot selectable by a pilot via the touchscreen display, the hotspot including a hotspot data which includes at least the chart data and the specific position.

The method may include receiving a pilot command to activate the hotspot data via the hotspot, the pilot command including a physical touch or a cursor-controlled selection of the specific position, the pilot command associated with at least one aircraft system including at least one of: a communication system (Comm), a navigation system (Nav), and a flight management system (FMS) and displaying a verification on the touchscreen display.

Further, the method may include receiving a pilot selection of the verification via a physical touch or cursor activation of the verification and commanding the at least one aircraft system to comply with the pilot selection of the verification.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for activation of chart data via touchscreen enabling a pilot to touch a system generated hotspot within the flight chart displayed on the touchscreen and thereby affect a change in an aircraft system. The system overlays a hotspot over chart data within the flight chart and associates the hotspot and hotspot data with the chart data. Upon reception of a pilot command of selection of the hotspot, the system verifies the pilot command with a verification message and interfaces with the aircraft to make the change in frequency, navigation, and path of the aircraft.

REFERENCE CHART

| | |
|---|---|
| 100 | System for Activation of Chart Data via Touchscreen |
| 102 | Touchscreen Display/Portable Electronic Device (PED) |
| 104 | PED Antenna |
| 110 | PED Controller |
| 112 | Coordinate System |
| 116 | PED Memory |
| 122 | Specific Position |
| 124 | Flight Chart |
| 126 | Hotspot (HS) |
| 128 | Chart Data |
| 130 | Interface |
| 132 | Interface Antenna |
| 140 | Flight Display Manager (FDM) |
| 142 | FDM Controller |
| 142 | Flight Display Controller |
| 144 | FDM Memory |
| 150 | Multi-Function Display (MFD) |
| 160 | Communications System (Comm) |
| 170 | Navigation System (Nav) |
| 180 | Flight Management System (FMS) |
| 200 | Enroute Chart View |
| 208 | HS Shape |
| 210 | Comm HS |
| 212 | Triangle Symbol Hotspot |
| 214 | Com HS Frequency Selection |
| 216 | Color HS |
| 218 | Dot Symbol Hotspot |
| 220 | Nav HS |
| 224 | Waypoint Nay HS |
| 226 | Chart Data Border |
| 230 | FMS HS |
| 300 | Arrival Chart View |
| 318 | BFI ATIS Comm HS |
| 320 | SEA Approach Comm HS |
| 322 | SEA ATIS Comm HS |
| 324 | TCM ATIS Comm HS |
| 326 | RNT ATIS Comm HS |
| 328 | JAKSN Nav HS |
| 330 | GLASR Nav HS |
| 340 | CRAN BROOK FMS HS |
| 342 | LOSTT FMS HS |
| 344 | MULLAN FMS HS |
| 346 | SPOKANE FMS HS |
| 348 | TEMPL FMS HS |
| 350 | SEA North FMS HS |
| 352 | SEA South FMS HS |
| 354 | TCM FMS HS |
| 356 | RNT FMS HS |
| 400 | Approach Ground Chart View |
| 402 | SEA 16R LOC Nav HS |
| 404 | SEA 16R Course Nav HS |
| 408 | SEA Tower Comm HS |
| 410 | SEA Ground Comm HS |
| 412 | SEA Clnc Del Comm HS |
| 414 | SEA CPDLC Comm HS |
| 420 | Straight in ILS FMS HS |
| 422 | LOC Mins FMS HS |
| 424 | Circling Mins FMS HS |
| 430 | SMGCS Flight Chart |
| 432 | Ramp Exit HS |
| 434 | Taxiway HS |
| 500 | Selection Sequence View |
| 502 | Pilot Selection |
| 504 | Pilot Verification |
| 506 | Status |
| 508 | Confirmation |
| 510 | Selection Indicator |
| 600 | Method Flow |

Figure 1:
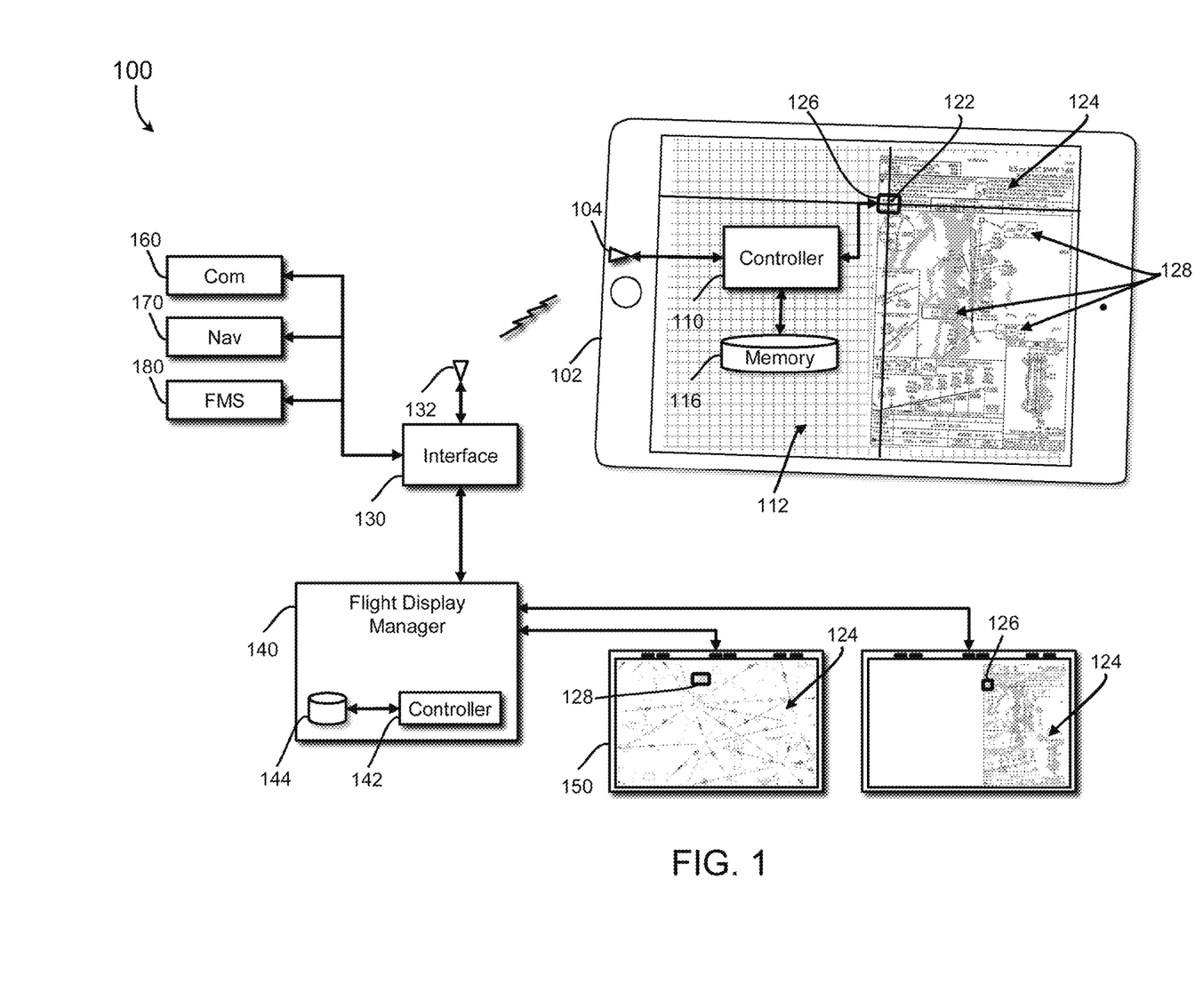
FIG. 1 is a diagram of a system for activation of chart data via touchscreen in accordance with an embodiment of the inventive concepts disclosed herein.

FIG. 1 System

Referring to FIG. 1, a diagram of a system for activation of chart data via touchscreen in accordance with an embodiment of the inventive concepts disclosed herein is shown. Generally, a system for activation of chart data via touchscreen 100 may include a touchscreen display 102 within a flight deck of an aircraft, the touchscreen display 102 configured at least for display of a flight chart 124. In one embodiment of the inventive concepts disclosed herein, the touchscreen display may include a Portable Electronic Device (PED) touchscreen display 102.

As used herein, the touchscreen display 102 may be used as a reference to each type of touchscreen display 102 available to a pilot. In some embodiments the touchscreen display 102 may further include a touchscreen Multi-Function Display (MFD) 150, a non-touchscreen interactive MFD 150 (e.g., activated by cursor-controlled pointer), and a Primary Flight Display (PFD), and a connected PED connected to one or more aircraft systems via an interface 130.

In one embodiment of the inventive concepts disclosed herein, the touchscreen display 102 may include its own PED Controller 110 operatively coupled with the touchscreen display 102. A tangible, non-transitory memory 116 may be configured to communicate with the PED controller 110, the tangible, non-transitory memory having instructions stored therein that, in response to execution by the PED controller 110, cause the PED 110 controller to carry out a plurality of function in compliance with the system for activation of chart data via touchscreen 100.

In addition, a flight display manager (FDM) 140 with an FDM controller 142 and FDM memory 144 may possess some parallel functions as the PED controller 110 and memory 116. As used herein, the PED controller 110 may be used to refer generally to a function of each of the PED controller 110 and the FDM controller 142.

In embodiments, the interface 130 may function between the touchscreen display 102 and one of more of the aircraft systems. The interface 130 may operatively and wirelessly connect with the PED 102 via an interface antenna 132 and a PED antenna 104. The interface 130 may function to receive signals from one of the touchscreen displays 102 and command one of more of the aircraft systems to comply with the received signals. Aircraft systems operably coupled with the interface 130 may include a communications system (Comm) 160, a navigation system (Nav) 170, and a flight management system (FMS) 180.

In one embodiment of the inventive concepts disclosed herein, the interface 130 may include a plurality of types of interfaces capable of receiving signals from one device and communicating those signals to a different device type. In one embodiment, the interface may function in compliance with an accepted standard such as an exemplary ARINC 661 standard for definition of a Cockpit Display System (CDS) communication between the CDS and the aircraft systems 160 170 180.

The flight chart 124 may include a plurality of flight chart types and display formats. In one embodiment of the inventive concepts disclosed herein, the flight chart 124 may include an exemplary portable document format (PDF) chart and a data generated chart. Here, each chart type may include the chart data 128 displayed within the flight chart 124. Each flight chart 124 employed by the system 100 may be marked with a certification 134 from an oversight authority responsible for publishing the flight chart 124.

The system for activation of chart data via touchscreen 100 may overlay a hotspot 126 associated with a specific position 122 within the touchscreen display 102. Here, the hotspot 126 may be collocated with a chart data 128 displayed on the flight chart 124. The chart data 128 may be displayed on the flight chart 124 as well as embedded within an additional layer of the flight chart 124. In one embodiment of the inventive concepts disclosed herein, the hotspot 126 may be selectable by a pilot via the touchscreen display 102, the hotspot 126 may include a hotspot data which includes at least the chart data 128 and the specific position 122.

In one embodiment of the inventive concepts disclosed herein, the hotspot data is associated with the flight chart. For example, a PDF fight chart may include as exemplary metadata, the hotspot data including the chart data 128 as well as the position of the hotspot 126. Also, the hotspot data may be included within a data set separate from but associated with the flight chart 124 to allow an operator to tailor the hotspot data to suit a purpose and size. Further, the hotspot data may exist within a data set separate from the flight chart 124 and applied to a specific page of the flight chart 124. Here, one option may offer the operator more flexibility in data size and formats.

In one embodiment of the inventive concepts disclosed herein, the specific position 122 may further include a reference to an X and Y coordinate system 112 usable by the touchscreen display 102. The coordinate system 112 may be an X and Y grid (invisible to the user) as well as additional types of grid systems which the PED controller 110 may recognize.

For example, the hotspot data may include a frequency and a position of the hotspot. One ATIS frequency may be 118.0 and the specific position of the hotspot may include an exemplary eight number position (e.g., 0,0; 2,0; 2,1; 0,1) or dialog directing the controller 110 to command the at least one aircraft system based on the hotspot data. Table 1 may list exemplary identification, frequency, and dialog of frequency related hotspots.

TABLE 1

| Name | Frequency | Dialog Specific Position |
|---|---|---|
| CLNC DEL | 128.0 | 0,0; −2,0; −2,1; 0,1 |
| ATIS | 118.0 | 0,3; −2,3; −2,1; 5,1 |
| Ground | 121.7 | 6,0; 8,0; 8,1; 6,1 |
| Tower | 119.9 | 4,0; 6,0; 6,1; 4,1 |
| APCH | 133.65 | 0,0; −2,0; −2,1; 0,1 |

Figure 2:
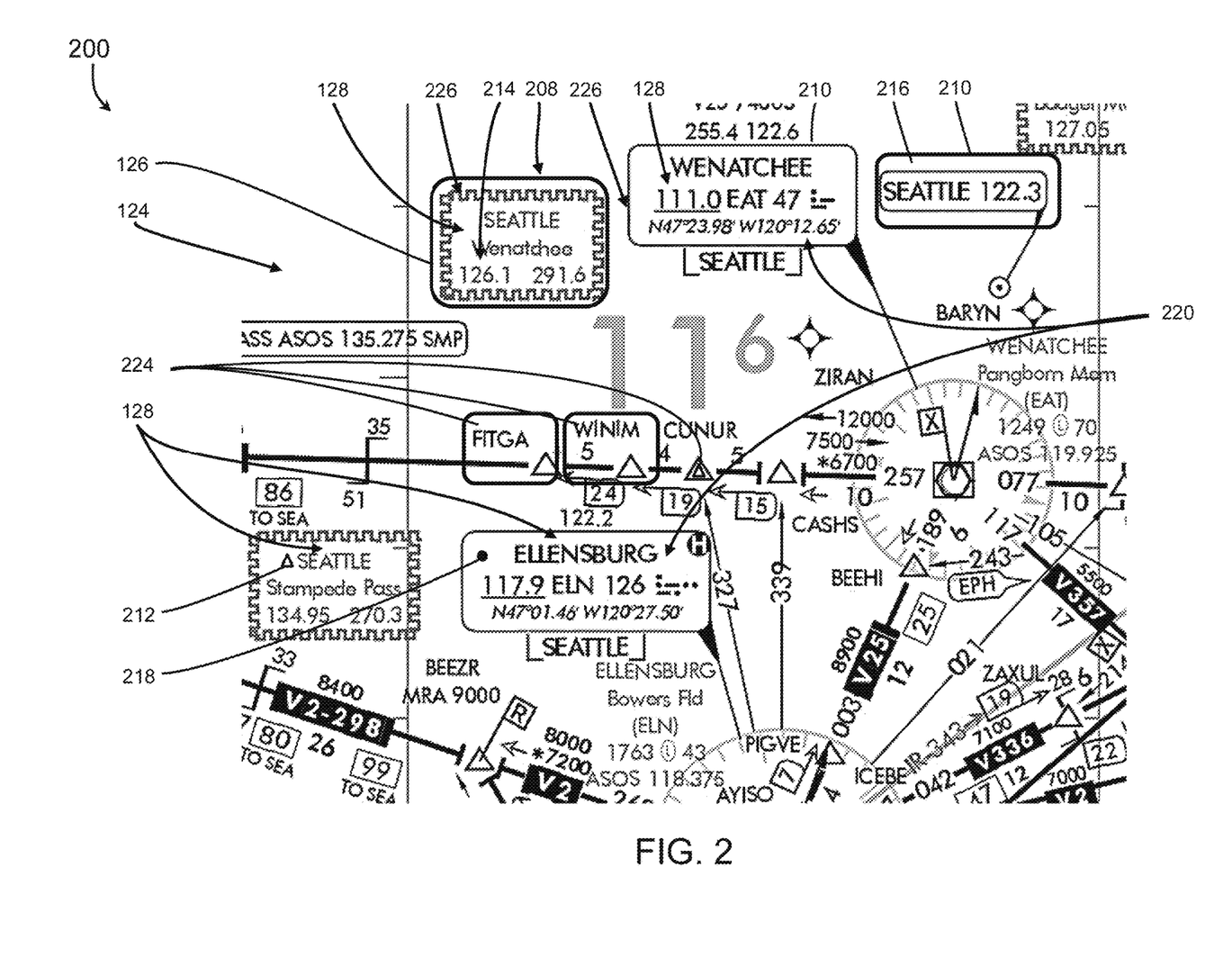
FIG. 2 is a diagram of an enroute flight chart view in accordance with an embodiment of the inventive concepts disclosed herein.

FIG. 2 Function

Referring now to FIG. 2, a diagram of an enroute flight chart view in accordance with an embodiment of the inventive concepts disclosed herein is shown. An enroute flight chart view 200 may indicate a variety of types and formats of hotspots 126 available to the system for activation of chart data via touchscreen 100.

In one embodiment of the inventive concepts disclosed herein, the PED controller 110 may function to display the flight chart 124 on the touchscreen display 102. Once displayed, the PED controller 110 may overlay the hotspot 126 over the chart data 128 at the specific position 122 within the flight chart 124.

In one embodiment of the inventive concepts disclosed herein, the PED controller 110 may display a comm hotspot 210, a nav hotspot 220 and an FMS hotspot 230 (FIG. 3) to the pilot enabling pilot selection of hotspots 126 at crucial moments during a flight where time is of the essence. Generally, the comm hotspot 210 may offer the pilot an available communication frequency listed on the flight chart 124 to select and tune on one of the communications systems 160. For example, should the pilot desire voice communications with Seattle Radio on 122.3, the pilot may select the comm hotspot 210 and enable the PED controller 110 to function with the interface 130 to tune one of the communications systems 160 to the frequency of 122.3.

Further contemplated herein, some flight charts 124 may remove the frequency field from the chart data 128 enabling the pilot to select who the pilot wishes to talk to without taking time to review or verify a specific VHF frequency.

The nav hotspot 220 may offer pilot selection of a navigation point within the chart data 128. For example, one nav hotspot 220 may refer to a frequency of a traditional VHF omnidirectional range (VOR) using the VOR frequency. Here, the pilot may select 117.9 for the Ellensburg (ELN) VOR as well as a tactical air navigation system (TACAN) channel 126 for additional (military) nav systems 170. Once the pilot may select the VOR frequency and desired nav system 170 (e.g., VOR1, VOR2), the selected nav system 170 may tune 117.9 allowing a VOR needle on a flight deck display to point to the Ellensburg VOR for follow on pilot navigation.

The hotspot data 128 associated with the ELN nav hotspot 220 may include a plurality of data identifying the nav hotspot 220. For example, the hotspot data associated with the ELN VOR nav hotspot 220 may include a position relative to a known datum (e.g., 47.0243742/–120.4584136), an elevation above MSL (1771.1 ft.), and a magnetic variation and year of measurement (21E (1980)). Additional detail may be included within the hotspot data including, for example, the Morse ID for ELN (• •■•• ■•) and class (e.g., H-VORW/DME).

An additional type of nav hotspot 220 may include a waypoint nav hotspot 224 which may be associated with a waypoint or intersection displayed on the flight chart 124. Here, the hotspot data associated with the waypoint nav hotspot 224 (e.g., FITGA) may include the position relative to the datum (e.g., Lat, Long) as well as the altitude of terrain associated with the waypoint nav hotspot 224.

In one embodiment of the inventive concepts disclosed herein, the FMS hotspot 230 (FIG. 3) may offer the pilot an ability to select a path for the pilot to send to the FMS 180 for pilot activation and execution via the FMS 180. The FMS hotspot 230 may be further detailed within the FIG. 3 discussion.

In one embodiment of the inventive concepts disclosed herein, the hotspot may maintain a hotspot shape 208 (e.g., rounded rectangle). In some situations, the hotspot shape 208 may be approximately equal and similar in shape to the shape of a chart data border 226 surrounding the chart data 128. In embodiments, the hotspot shape may further include a plurality of forms of a selectable shape within the chart data border 226 surrounding the chart data 128. In one embodiment, the hotspot shape 208 may include an exemplary dot symbol hotspot 218 as well as a triangle symbol hotspot 212 sited within the chart data border as well as similar to the shape of the displayed point (CUNUR).

Additionally, the hotspot may include a translucent color distinct from the chart data 128 using a colored hotspot 216 to distinguish the hotspot (here a comm hotspot 210) from the surrounding colors of the flight chart 124.

In one embodiment of the inventive concepts disclosed herein, the PED controller 110 may receive a pilot command to activate the hotspot data 128 via the hotspot, the pilot command at least a physical touch of the specific position 122 as well as an active pilot interaction to select the specific position 122. Similar in function to a traditional touchscreen display, the touchscreen display 102 may recognize a plurality of input types including a touch of a finger, a touch and hold of a finger for a period, a touch of a specific pen, a cursor-controlled pilot interaction to select the specific position 122, as well as additional methods of human interaction with the touchscreen display 102.

Figure 3:
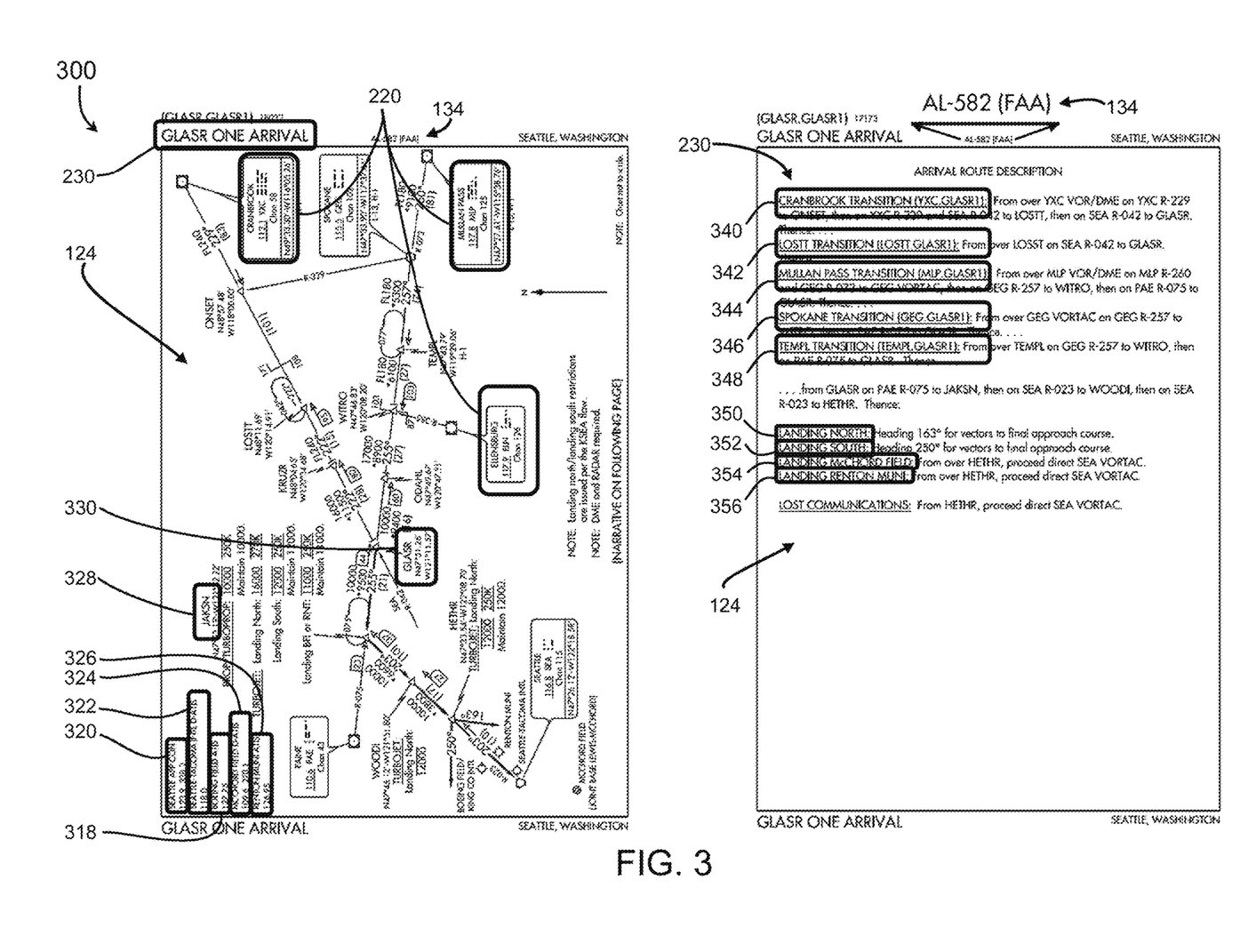
FIG. 3 is a diagram of an arrival flight chart view exemplary of an embodiment of the inventive concepts disclosed herein.

FIG. 3 Arrival

Referring now to FIG. 3, a diagram of an arrival flight chart view exemplary of an embodiment of the inventive concepts disclosed herein is shown. An Arrival Chart View 300 may include similar options for pilot selection of the hotspot (HS) 126 in additional formats according to the display of the arrival flight chart 124.

Comm hotspots 210 overlain on the arrival chart view 300 may include a Boeing Filed (BFI) ATIS Comm HS 318, a Seattle Tacoma Intl (SEA) Approach Comm HS 320, a SEA ATIS Comm HS 322, a Tacoma (TCM) ATIS Comm HS 324, and a Renton (RNT) ATIS Comm HS 326.

Exemplary nav hotspots 220 may include Cranbrook, Mullan Pass, and Ellensburg as well as waypoint hotspots JAKSN Nav HS 328 and GLASR Nav HS 330.

In one embodiment of the inventive concepts disclosed herein, the FMS hotspot 230 may be a selection of a path and a procedure for the system for activation of chart data via touchscreen 100 to command the FMS 180 to apply to an active path of the aircraft. For example, the GLASR ONE arrival to the SEA area may include a plurality of options for arrivals including nav hotspots 220 for Cranbrook (YXC), Mullan Pass (MLP), and Ellensburg (ELN). Here, the pilot may select the nav hotspot 220 and while flying direct to MLP the pilot may select the Mullan pass transition FMS hotspot 344.

Additional optional FMS HS 230 may include CRANBROOK FMS HS 340, a LOSTT FMS HS 342, a MULLAN FMS HS 344, a SPOKANE FMS HS 346, a TEMPL FMS HS 348, a SEA North FMS HS 350, a SEA South FMS HS 352, a TCM FMS HS 354, and an RNT FMS HS 356. Each option may enable the pilot to easily select the desired path for arrival into the Seattle area landing at any of the fields served by the GLASR ONE arrival. Significantly, should the pilot experience an emergency requiring an immediate landing at an airfield different from originally planned, the system for activation of chart data via touchscreen 100 may enable the pilot to select and execute an alternate arrival procedure to maneuver the aircraft to a closer emergency airfield.

Figure 4:
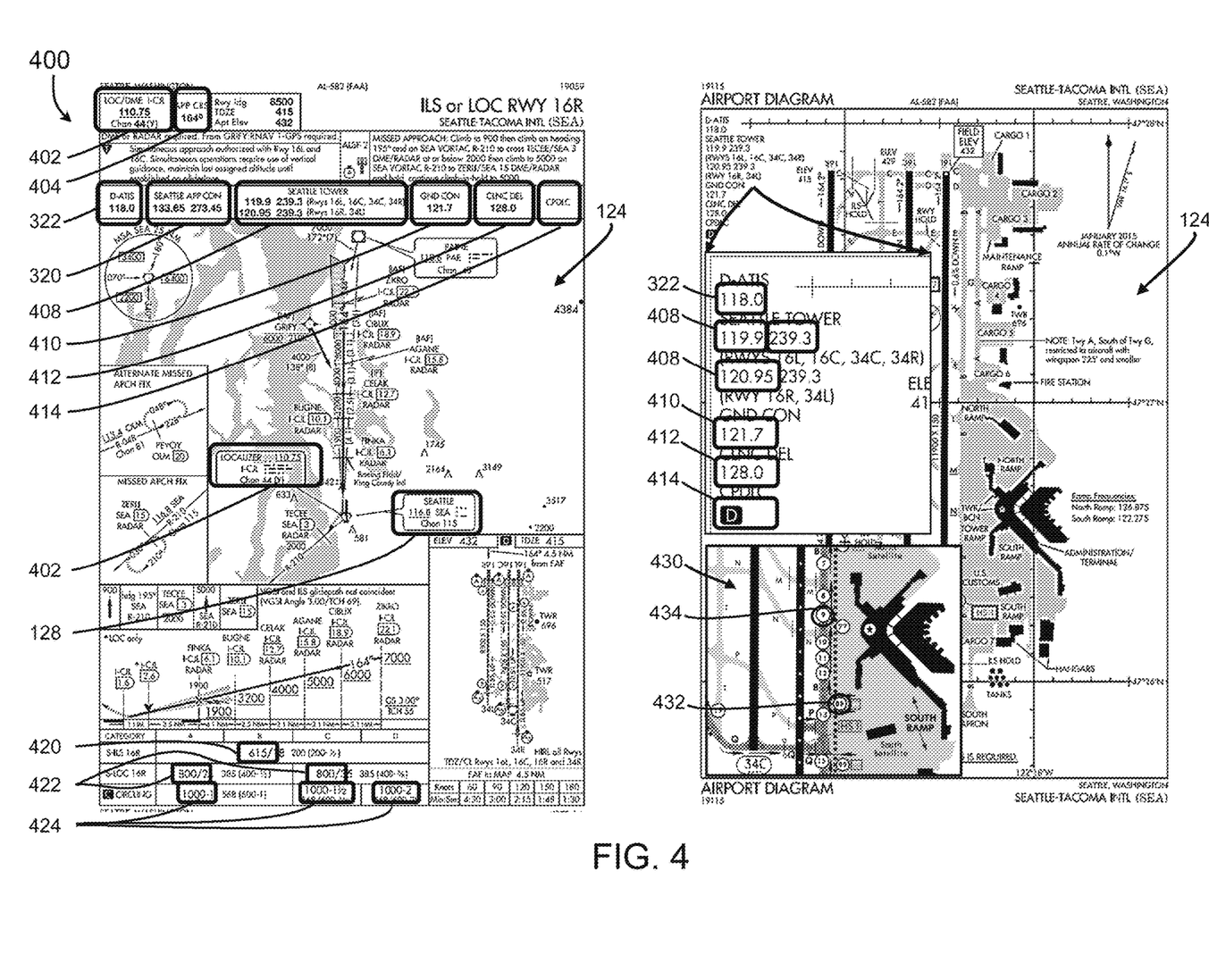
FIG. 4 is a diagram of an approach and ground flight chart view exemplary of one embodiment of the inventive concepts disclosed herein.

FIG. 4 Approach Ground

Referring now to FIG. 4, a diagram of an approach and ground flight chart view exemplary of one embodiment of the inventive concepts disclosed herein is shown. The approach and ground view 400 may display additional options for available hotspots 126 to overlay and display to the pilot.

Exemplary nav HS 220 may include a SEA 16R LOC Nav HS 402 to tune one of the ILS receivers to 110.75. Also, a SEA 16R Course Nav HS 404 for pilot selection of a specific course to fly to land on runway 16R at SEA.

Exemplary comm HS 210 may include a SEA Tower Comm HS 408, a SEA Ground Comm HS 410, a SEA Clnc Del Comm HS 412, and a SEA CPDLC Comm HS 414. Some FMS HS 230 may include a Straight in ILS FMS HS 420, a LOC Mins FMS HS 422 to apply a specific minimum descent altitude or decision height to the approach procedure via the FMS 180. Also, a Circling Mins FMS HS 424 may be available to the pilot should a circling approach be in use.

In one embodiment of the inventive concepts disclosed herein, the pilot may select a surface movement guidance and control system (SMGCS) flight chart 430 from a ground menu. Here, the pilot may select a taxi procedure and available ramp exit HS 432 and a taxiway HS 434. In this manner, the system for activation of chart data via touchscreen 100 may enable the pilot to select specific routes and points on the SMGCS flight chart 430 to increase pilot situational awareness.

In embodiments, the chart data 128 and associated hotspot data may refer to at least one of a voice frequency, a navigation aid frequency, a waypoint including a waypoint position, an altitude, an arrival procedure, an approach procedure, and a taxi procedure. In an additional embodiment, the system for activation of chart data via touchscreen 100 may function to scan the flight chart 124 for available chart data 128, recognize the chart data 128 within the flight chart 124, and display the hotspot 126 collocated with the recognized chart data 128.

Figure 5:
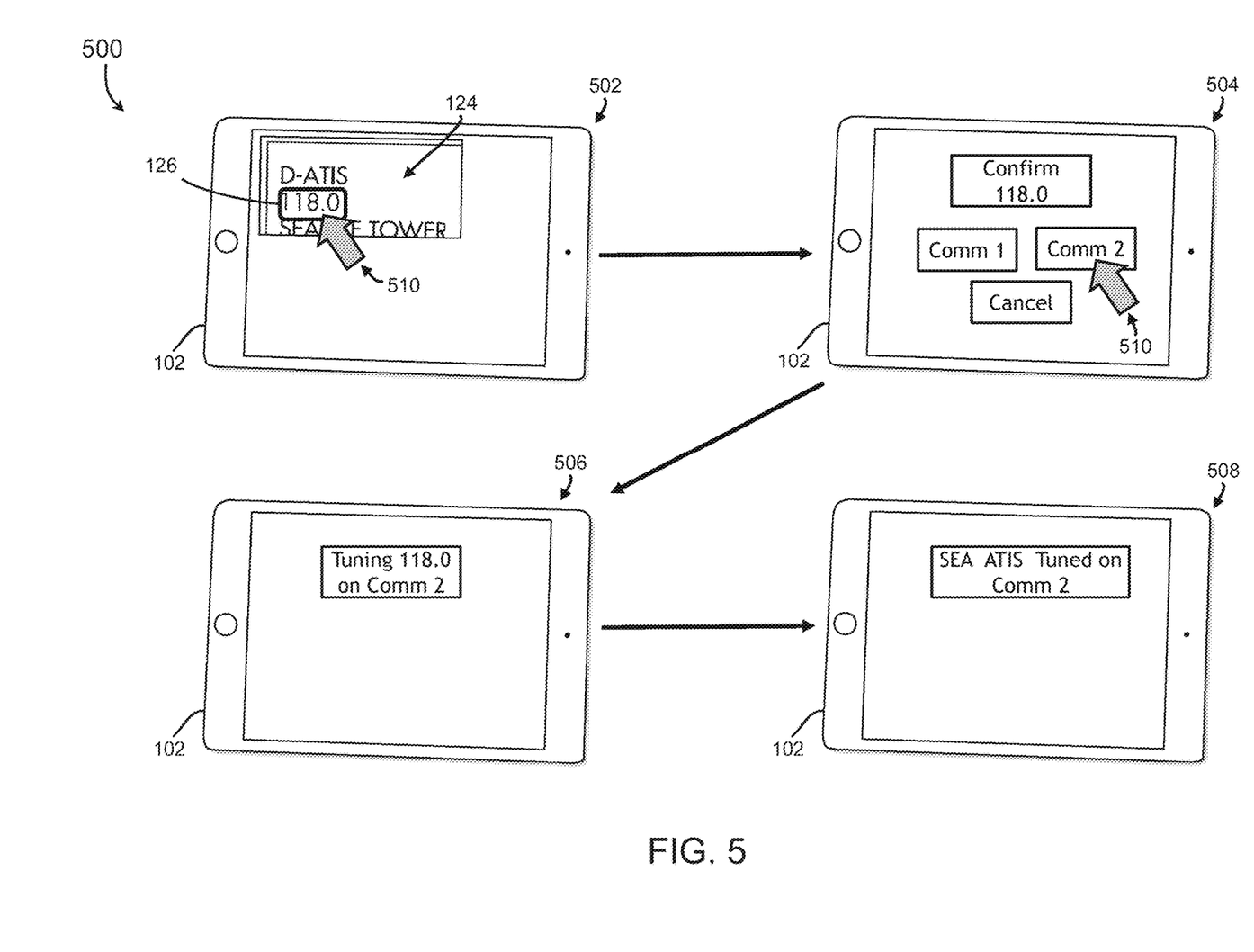
FIG. 5 is a diagram of a hotspot selection sequence in accordance with one embodiment of the inventive concepts disclosed herein.

FIG. 5 Sequence

Referring now to FIG. 5, a diagram of a hotspot selection sequence in accordance with one embodiment of the inventive concepts disclosed herein is shown. In one embodiment of the inventive concepts disclosed herein, a selection sequence view 500 may include exemplary steps of pilot selection and operation of the system for activation of chart data via touchscreen 100.

Here, the pilot selection may be indicated by selection indicator 510 (arrow). The pilot may select the ATIS frequency of 118.0, shown in pilot selection 502, by touching the hotspot 126. Once the PED controller 110 receives the pilot command, the PED controller 110 may display a pilot verification 504 on the touchscreen display 102. Here, the pilot verification 504 may include a choice of the aircraft system.

The PED controller 110 may receive a pilot selection of the pilot verification 504 via a physical touch of the pilot verification 504 or a cursor-controlled interaction to select the pilot verification 504, and command the at least one aircraft system via the interface 130 to comply with the pilot selection of the pilot verification 504. The PED controller 110 may momentarily display a status 506 while the system for activation of chart data via touchscreen 100 functions to tune comm 2 to 118.0 and then a momentary confirmation 508 that the comm system 160 is tuned to the selected frequency.

In one embodiment of the inventive concepts disclosed herein, the hotspot data may further include an available choice of communications systems 160. For example, most transport category aircraft may employ multiple comm systems 160. At a minimum, two comm systems 160 may be in use for transport. Also, an available choice of navigation systems 170 may include, as discussed above, one or more ILS systems and one or more VOR systems. Further the PED controller 110 may enable an available choice of flight management systems 180 as most aircraft may employ more than one FMS system 180.

Figure 6:
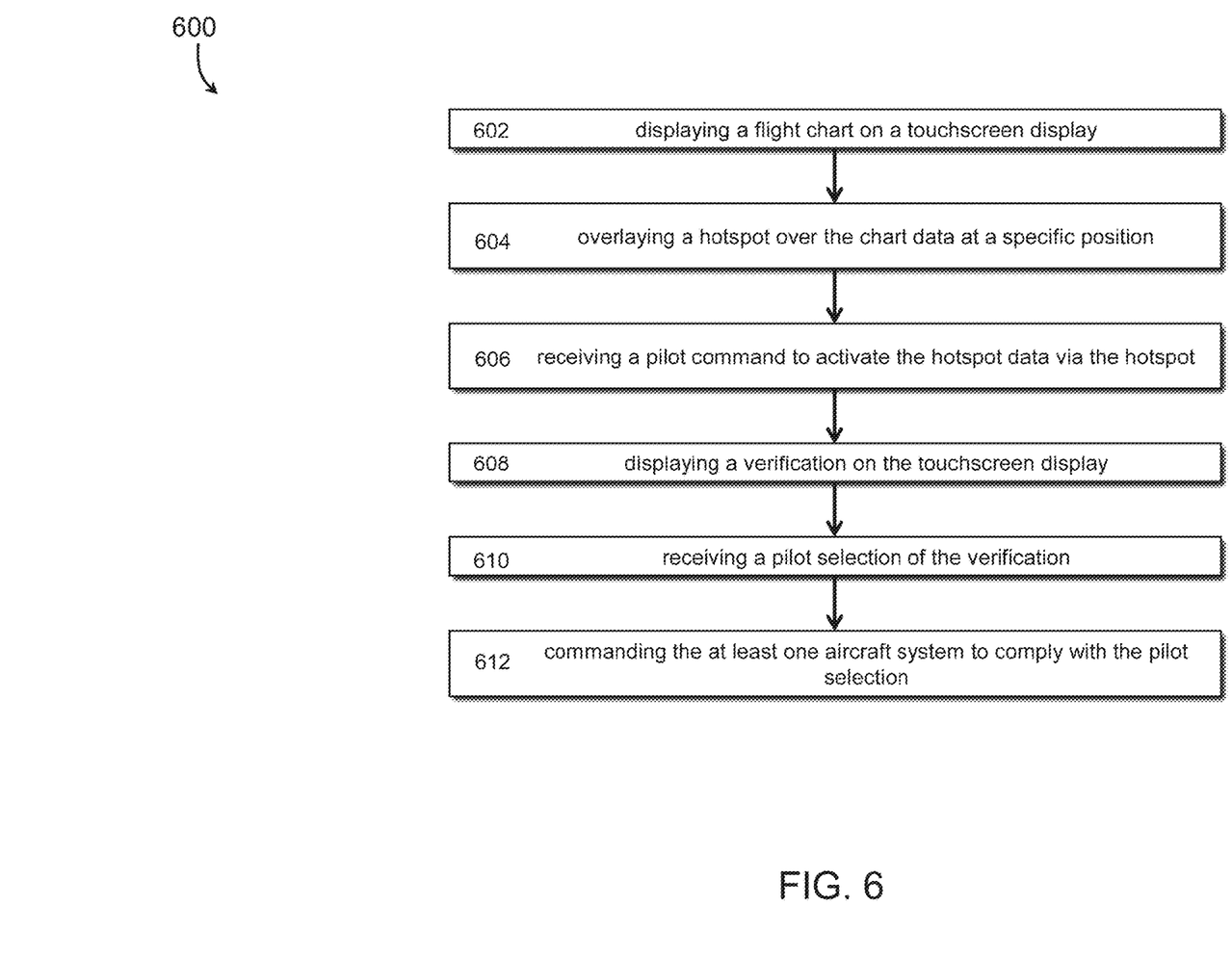
FIG. 6 is a diagram of an exemplary method flow in accordance with one embodiment of the inventive concepts disclosed herein.

FIG. 6 Method Flow

Referring now to FIG. 6, a diagram of an exemplary method flow in accordance with one embodiment of the inventive concepts disclosed herein is shown. The method flow 600 may include, at a step 602, displaying a flight chart on a touchscreen display within a flight deck of an aircraft, the touchscreen display configured at least for display of a flight chart, the flight chart including at least one instance of a chart data. Ata step 604, the method may include overlaying a hotspot over the chart data at a specific position within the touchscreen display, the hotspot collocated and associated with the chart data displayed on the flight chart, the hotspot selectable by a pilot via the touchscreen display, the hotspot including a hotspot data which includes at least the chart data and the specific position.

At a step 606, the method may include receiving a pilot command to activate the hotspot data via the hotspot, the pilot command a physical touch or cursor-controlled selection of the specific position, the pilot command associated with at least one aircraft system including at least one of: a communication system (Comm), a navigation system (Nav), and a flight management system (FMS) while a step 608 may include displaying a verification on the touchscreen display.

A step 610 may include receiving a pilot selection of the verification and a step 612 may include commanding the at least one aircraft system to comply with the pilot selection of the verification.

CONCLUSION

As will be appreciated from the above description, embodiments of the inventive concepts disclosed herein may provide a novel solution to changing a frequency and a navigation path via an interactive touchscreen within an aircraft communications or navigation system.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for activation of chart data via a touchscreen, comprising:

a touchscreen display within a flight deck of an aircraft, the touchscreen display configured at least for display of a specific flight chart, of a plurality of flight charts, each of the plurality of flight charts marked with a certification;

a hotspot associated with a specific position within the specific flight chart, the hotspot collocated with a chart data displayed within the specific flight chart, the hotspot selectable by a pilot via the touchscreen display, the hotspot specific position unique to the specific flight chart, the hotspot including a hotspot data which includes at least the chart data and the specific position, wherein the chart data refers to at least one of a voice frequency, a navigation aid frequency, a waypoint including a waypoint position, an altitude, an arrival procedure, an approach procedure, and a taxi procedure, each associated with the specific flight chart, and wherein the chart data is unique to the specific flight chart;

an interface between the touchscreen display and at least one aircraft system, the at least one aircraft system including one of: a communication system (Comm), a navigation system (Nav), and a flight management system (FMS);

a controller operatively coupled with the touchscreen display;

a tangible, non-transitory memory configured to communicate with the controller, the tangible, non-transitory memory having instructions stored therein that, in response to execution by the controller, cause the controller to:

display the specific flight chart on the touchscreen display;

overlay the hotspot over the chart data at the specific position within the specific flight chart;

receive a pilot input to activate the hotspot data via the hotspot;

in response to the pilot input, display a verification on the touchscreen display;

receive a pilot selection of the verification; and in response to the pilot selection of the verification:

update the specific flight chart on the touchscreen display to display the chart data corresponding to the activated hotspot; and command the at least one aircraft system via the interface to comply with the pilot selection of the verification.

2. The system for activation of chart data via the touchscreen of claim 1, wherein the touchscreen display further comprises one of a touchscreen Multi-Function Display (MFD), an interactive MFD, a touchscreen or interactive Primary Flight Display (PFD), and a connected Portable Electronic Device (PED).

3. The system for activation of chart data via the touchscreen of claim 1, wherein the hotspot maintains one of: a hotspot shape similar to a chart data border shape surrounding the chart data, a selectable shape within the chart data border shape surrounding the chart data, and a translucent color distinct from the chart data.

4. The system for activation of chart data via the touchscreen of claim 1, wherein the hotspot data is one of: associated with the specific flight chart, within a data set separate from and associated with the specific flight chart, and within a data set separate from the specific flight chart and applied to a specific flight chart page.

5. The system for activation of chart data via the touchscreen of claim 1, wherein the specific position further comprises a reference to an X and Y coordinate system usable by the touchscreen display and wherein the pilot input includes one of a physical touch of the specific position and an active pilot interaction to select the specific position.

6. The system for activation of chart data via the touchscreen of claim 1, wherein the hotspot is collocated with the chart data by:

scanning the specific flight chart for available chart data; and recognizing the chart data within the specific flight chart.

7. The system for activation of chart data via the touchscreen of claim 6, wherein the specific flight chart further comprises at least one of a portable document format (PDF) chart and a data generated chart.

8. The system for activation of chart data via the touchscreen of claim 1, wherein the hotspot data further includes an available choice of communications systems, an available choice of navigation systems, and an available choice of flight management systems.

9. The system for activation of chart data via the touchscreen of claim 1, wherein the verification includes a choice of the at least one aircraft system.

10. A method for activation of chart data via a touchscreen, comprising:

displaying a specific flight chart, of a plurality of flight charts, on a touchscreen display within a flight deck of an aircraft, the touchscreen display configured at least for display of the specific flight chart, the specific flight chart presents at least one instance of a chart data and at least one certification mark, the chart data refers to at least one of a voice frequency, a navigation aid frequency, a waypoint including a waypoint position, an altitude, an arrival procedure, an approach procedure, and a taxi procedure, each associated with the specific flight chart, and wherein the chart data is unique to the specific flight chart;

overlaying a hotspot over the chart data at a specific position within the touchscreen display, the hotspot collocated and associated with the chart data displayed on the specific flight chart, the hotspot specific position unique to the specific flight chart, the hotspot selectable by a pilot via the touchscreen display, the hotspot including a hotspot data which includes at least the chart data and the specific position;

receiving a pilot input to activate the hotspot data via the hotspot, the input one of: a physical touch of the specific position and a pilot selection of the physical position, the pilot input associated with at least one aircraft system including at least one of: a communication system (Comm), a navigation system (Nav), and a flight management system (FMS);

in response to the pilot input, displaying a verification on the touchscreen display;

receiving a pilot selection of the verification; and in response to the pilot selection of the verification:

updating the specific flight chart on the touchscreen display to display the chart data corresponding to the activated hotspot; and commanding the at least one aircraft system to comply with the pilot selection of the verification.

11. The method for activation of chart data via the touchscreen of claim 10, wherein overlaying a hotspot over the chart data further comprises displaying a shape similar to a chart border shape surrounding the chart data, a selectable shape within the chart border surrounding the chart data, and a translucent color distinct from the chart data.

12. The method for activation of chart data via the touchscreen of claim 10, wherein the hotspot data further includes an available choice of communications systems, an available choice of navigation systems, and an available choice of flight management systems.

13. The method for activation of chart data via the touchscreen of claim 10, wherein displaying a verification on the touchscreen display further comprises displaying an optional selection of one of the at least one aircraft system.

* * * * *